(12) United States Patent
Ahne et al.

(10) Patent No.: US 6,599,041 B1
(45) Date of Patent: Jul. 29, 2003

(54) SHEET MOVEMENT SENSOR

(75) Inventors: Adam Jude Ahne, Lexington, KY (US); Michael Clark Campbell, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 09/793,384

(22) Filed: Feb. 26, 2001

(51) Int. Cl.[7] .................................................. B41J 11/42
(52) U.S. Cl. ...................................... 400/582; 400/578
(58) Field of Search ................................. 400/582, 578

(56) References Cited

U.S. PATENT DOCUMENTS

| | | | |
|---|---|---|---|
| 1,917,379 A | | 8/1933 | Lowry |
| 3,917,142 A | * | 11/1975 | Guarderas .................... 226/100 |
| 4,203,589 A | | 5/1980 | Arrasmith |
| 4,281,244 A | * | 7/1981 | Murata et al. .......... 250/223 R |
| 4,424,964 A | | 1/1984 | Kikuchi et al. |
| 4,484,070 A | | 11/1984 | Inoue |
| 4,644,372 A | | 2/1987 | Hirota |
| 4,834,568 A | | 5/1989 | Kagami et al. |
| 4,925,177 A | | 5/1990 | Nakamura et al. |
| 4,958,069 A | * | 9/1990 | Okamori .................. 250/223 R |
| 4,983,854 A | * | 1/1991 | Mizuno et al. .......... 250/223 R |
| 5,027,993 A | * | 7/1991 | Ferguson ...................... 226/24 |
| 5,075,543 A | * | 12/1991 | Courtney ................ 250/223 R |
| 5,139,339 A | | 8/1992 | Courtney et al. |
| 5,149,980 A | * | 9/1992 | Ertel et al. .............. 250/559.32 |
| 5,365,322 A | | 11/1994 | Hamada et al. |
| 5,751,443 A | * | 5/1998 | Borton et al. ................ 356/446 |
| 5,754,213 A | * | 5/1998 | Whritenor ................. 250/559.4 |
| 5,764,251 A | * | 6/1998 | Hashimoto ............. 250/559.16 |
| 6,047,110 A | * | 4/2000 | Smith ......................... 358/1.12 |
| 6,210,052 B1 | * | 4/2001 | Smith ......................... 400/103 |
| 6,215,552 B1 | * | 4/2001 | Acquaviva et al. .......... 356/601 |
| 6,217,168 B1 | * | 4/2001 | Elgee ....................... 250/559.4 |
| 6,291,829 B1 | * | 9/2001 | Allen et al. ............. 250/559.07 |
| 6,330,057 B1 | * | 12/2001 | Lederer et al. ................ 356/28 |
| 6,424,407 B1 | * | 7/2002 | Kinrot et al. .................. 356/28 |

* cited by examiner

*Primary Examiner*—Charles H. Nolan, Jr.
(74) *Attorney, Agent, or Firm*—Thompson Hine LLP

(57) ABSTRACT

A sensor for detecting movement of a sheet of media including a light emitting element and a light sensing element for detecting at least part of the light emitted from the light emitting element and reflected by the sheet, the light sensing element providing an output. The sensor further includes a processor receiving the output of the light sensing element and detecting movement of the sheet based upon the output.

36 Claims, 1 Drawing Sheet

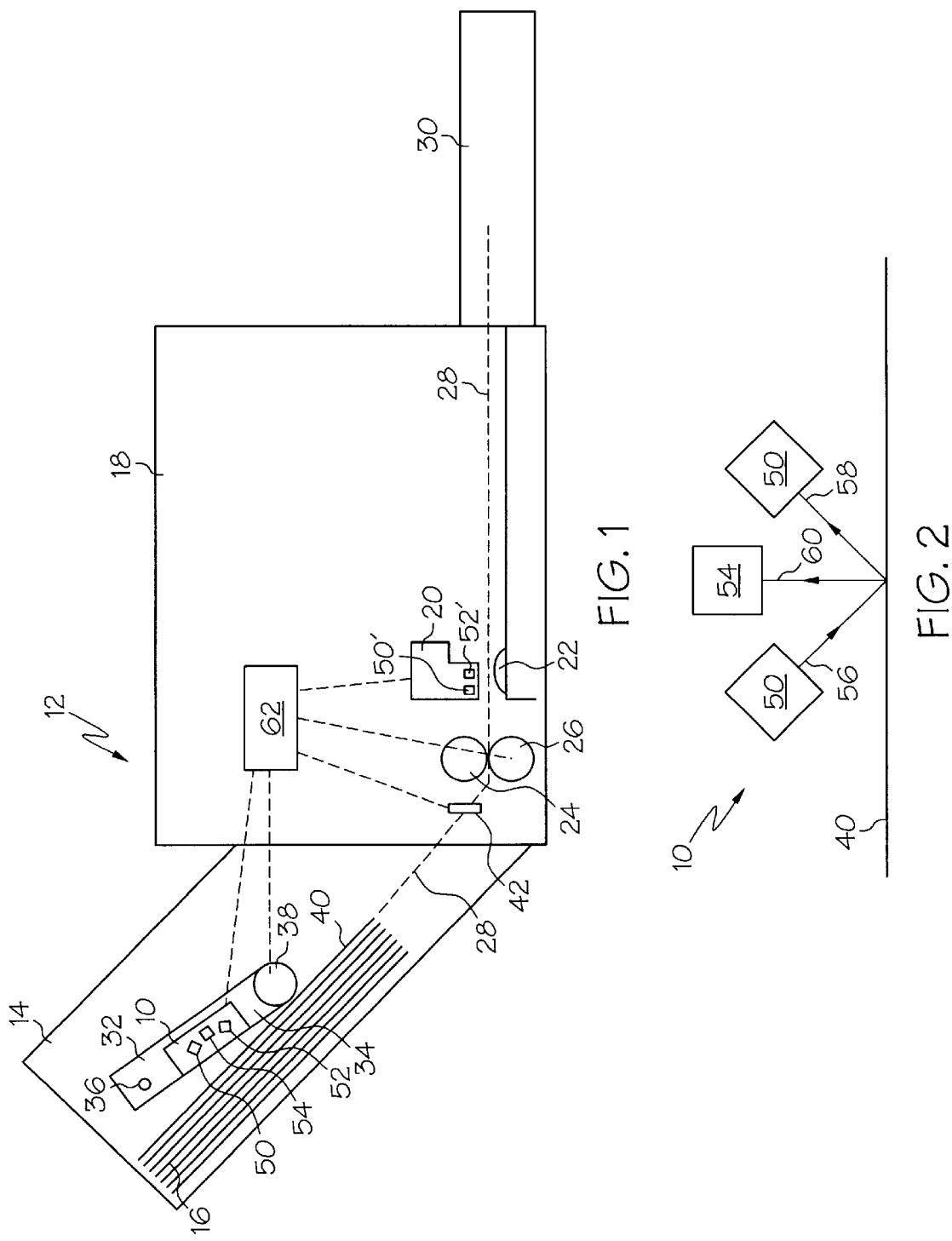

SHEET MOVEMENT SENSOR

The present invention is directed to a sensor for detecting movement of a sheet of media, and more particularly, to a reflective optical sensor for detecting movement of a sheet.

BACKGROUND OF THE INVENTION

Electronic office equipment, such as printers, copies, facsimile machines, scanners, business machines and the like typically move sheets of paper, transparencies or other media from an input tray to a printing area, and from the printing area to an exit or storage tray. The office equipment may include a number of sheet-detecting sensors located along the page of movement of the sheet to detect the presence or absence of a sheet. However, such sensors only detect the presence or absence of a sheet, and can not detect the state of movement of a sheet.

The electronic office equipment may also include a media sensor to determine the media type of the sheet located within the input tray. The media sensor typically includes a light emitting element and a light sensing element that detects light emitted by the light emitting element and reflected by the sheet of media. The amount of light sensed by the light sensing element is fed to a processor to determine the type of media. However, such media sensing sensors do not detect the movement of the examined sheet. Accordingly, there is a need for a sensor for detecting movement of a sheet. There is also a need for a sensor that can detect the media type of sheet as well as movement of the sheet.

SUMMARY OF THE INVENTION

The present invention is a sensor for detecting movement of a sheet, and a sensor for detecting media type of a sheet as well as movement of the sheet. In one embodiment, the invention is a sensor for detecting movement of a sheet of media including a light emitting element and a light sensing element for detecting at least part of the light emitted from the light emitting element and reflected by the sheet, the light sensing element providing an output. The sensor further includes a processor receiving the output of the light sensing element and detecting movement of the sheet based upon the output.

Accordingly, it is an object of the present invention to provide an inexpensive and effective sensor for detecting movement of a sheet of media. Other objects and advantages of the present invention will be apparent from the following description and the accompanying drawings.

BRIEF DESCRIPTION OF DRAWINGS

FIG. 1 is a schematic representation of a printer including one embodiment of the sensor of the present invention; and FIG. 2 is a schematic representation of the sensor of FIG. 1.

DETAILED DESCRIPTION

As shown in FIG. 1, the sensor 10 of the invention is used in a printer 12, although the sensor may be used in various other office equipment besides printers. The printer 12 includes an input tray 14 which stores the sheets of media 16 to be used in the printer. The printer 12 may include multiple input trays 14, but only one input tray is shown in FIG. 1. The printer 12 also includes a printer body 18 having a print head 20 and a set of cockle ribs 22 located opposite the print head. A pressure roller 24 and a feed roller 26 are located adjacent to the print head 20 and cockle ribs 22. The printer 12 includes a media path 28 that extends from the input tray 14, through the printer body 18, and into an output tray 30.

The printer 12 includes an auto-compensator 32 located inside the input tray 14 which provides a paper feed function. The auto-compensator 32 includes an arm 34 that is pivotably mounted to a pin 36, and the arm 34 includes a rotatable tire 38 at its distal end. The arm 34 can pivot about the pin 36 as the number of sheets 16 in the input tray 14 varies, and the arm 34 is preferably biased downwardly, such as by a spring (not shown). In this manner, the tire 38 is always biased into engagement with the top sheet 40 in the input tray 14. Alternately, the sheets 16 in the input tray 14 may be biased against the tire 38.

In operation, the auto-compensator 32 is activated to rotate the tire 38 such that the top sheet 40 in the input tray 14 is moved along the media path 28 towards the feed roller 26 and pressure roller 24. The tire 38 may be made of a relatively rough or functional surface to ensure proper engagement with the sheet 40. As the sheet 40 moves along the media path 28, it is urged between the nip of the pressure roller 24 and feed roller 26, and then fed between the print head 20 and the cockle ribs 22. As the sheet 40 is passed below the print head 20, the print head 20 reciprocates across the width of the printer and prints indicia on the sheet 40. The sheet 40 is then further urged along the media path 28 until it exits the printer body 18 and is received in the exit tray 30.

The printer 12 may include a fixed sensor 42 located adjacent the pressure roller 24 and the feed roller 26 to detect the presence or absence of a sheet adjacent the fixed sensor 42. The fixed sensor 42 is primarily used to determine that a sheet has been successfully moved by the auto-compensator 32 to the feed roller 26.

In the illustrated embodiment, the sensor 10 is located in the arm 34 of the auto-compensator 32, and is shown in greater detail in FIG. 2. The sensor 10 is preferably a reflective optical sensor, and includes a light emitting element 50 for emitting light directed toward the sheet 40, and a light sensing element 52 for detecting light reflected by the sheet. The light emitting element 50 is typically located at an angle relative to the sheet 40 and the light sensing element 52 is located at the same angle relative the sheet 40 to detect light that is reflected by the sheet. The sensor 10 may also include an auxiliary light sensing element 54 that is located immediately above the point where the light 56 emitted from the light emitting element 50 intersects the sheet 40. The auxiliary light sensing element 54 detects lights diffused by the sheet 40. Such a reflective optical sensor 10 to detect the media type of a sheet is known, for example, as disclosed in U.S. Pat. No. 5,139,339 to Courtney et al., hereby incorporated by reference.

When the sensor 10 is used to sense media type, the light emitting element 50 emits a beam of light 56. The light 56 can be generally reflected by the sheet 40 as reflective beam 58, or generally diffused by the sheet as a diffused beam 60, or both reflected and diffused, depending upon the media type of the sheet. The amount of light detected by either light sensing element 52, 54 is indicative of the amount of light either reflected or diffused by the sheet 40, which is in turn indicative of the media type of the sheet 40.

The sensor 10 of the present invention is coupled to a processor 62 that processes an output from the sensor 10 (more particularly, an output from the light sensing element or elements) to detect movement of a sheet. Because sheets of most media (i.e., particularly paper) do not have uniform properties (i.e., have varying density, coloring, shading, thickness, etc. across the surface of the sheet), the light reflected by the sheet and detected by the light sensing elements 52, 54 varies during movement of the sheet. Thus, when a sheet is moving below the sensor 10, the output of a light sensing element, 52, 54 will be random signals, or a high frequency signal, also termed "noise." The processor 62 is programmed to recognize a noise output and thereby ascertain movement of the sheet 40. In contrast, when the sheet 40 is stationary, the sensed reflective properties of the paper are static or uniform, and the output of the light sensing elements 52, 54 is generally static.

Movement of the tire 38 and/or of the sheet 40 may also cause displacement or vibration of the sensor 10 (i.e., movement of either the light emitting element 50 or the light sensing elements 52, 54, or both). The vibration or movement of the sensor 10 thus also creates noise that is sensed by the processor 62 as indicative of movement of the sheet 40.

The sensor 10 may also be mounted onto a carrier (not shown) that carries the print head 20. In this case the sensor 10 is illustrated in FIG. 1 as including light emitting element 50' and light sensing element 52'. In this case, it is expected that the carrier and print head 20 would be stationary during sensing operations. However, it is advantageous to mount the sensor 10 onto the carrier so that sheet movement can be detected at critical locations in the printer (i.e. just below the print head 20). Furthermore, mounting the sensor 10 on the carrier (or downstream of the tray 14) is advantageous if the printer 12 has more than one input tray. Mounting the sensor 10 downstream of the trays 14 ensures that a single sensor 10 can detect movement/media type of sheets originating from different input trays when more than one input tray 14 is used.

A sheet moving along the media path 28 is especially susceptible to misfeeds when the sheet is fed between the nip of the pressure roller 24 and the feed roller 26. Thus, if the fixed sensor 42 is used in conjunction with the sensor 10, the processor 62 can check for movement of the sheet after the fixed sensor 42 has been activated and the sheet is approaching the nip. Alternately, if the fixed sensor 42 is not used, movement of the sheet by the sensor 10 can be continually monitored, or can be checked at critical times based upon timing and expected movement of the sheet. The sensor 10, due to its constant monitoring capabilities, can provide feedback to the processor 62 to ensure that the sheet continues to move along the media path 28 even after it is passed through the nip of the pressure roller 24 and feed roller 26.

In the illustrated embodiment, the sensor 10 provides a dual function of both media sensing and sheet movement. In this case, the sensor 10 is preferably located on the arm 34 to maintain a fixed distance between e sensor 10 and the top sheet 40 in the input tray 14. In order to, perform media sensing functions, the sensor 10 should be maintained at a fixed distance from the sheet to be media sensed. The "fixed distance" may be an air gap between the sensor 10 and the sheet 40, or the sensor 10 may be pressed into contact with the top sheet 40. However, it is not critical that the sensor of the present invention perform media sensing functions.

Thus, when not performing media sensing functions, the sensor 10 need not be mounted on the arm 34 and need not be mounted such that it is located at a fixed distance from the top sheet 40 in the input tray 14.

When operating solely as a movement sensor, the sensor 10 may be located at nearly any location along the media path 28 to detect movement of a sheet. For example, the sensor 10 may be mounted on a mechanism (separate from the auto-compensator 32) located in the input tray 14 such that the sensor 10 rides on the top sheet 40 in a manner similar to the tire 38. The sensor 10 may also be located on a sled (not shown) that rides on top of the sheet 40 in the tray 14. The sled may be an arm or other strip of material that is spring biased downwardly onto the sheet 40 in the tray 14, and the sensor 10 may be located at a distal end of the sled. In this case, the sensor is preferably pressed against the sheet 40 such that there is no air gap between the sensor 10 and the sheet 40. In this case, the sensor 10 could be used for both media sensing and paper movement sensing, or only paper movement sensing.

The sensor 10 may also be mounted onto a carrier (not shown) that carries the print head 20. In this case, it is expected that the carrier and print head 20 would be stationary during sensing operations. However, it is advantageous to mount the sensor 10 onto the carrier so that sheet movement can be detected at critical locations in the printer (i.e. just below the print head 20). Furthermore, mounting the sensor 10 on the carrier (or downstream of the tray 14) is advantageous if the printer 12 has more than one input tray. Mounting the sensor 10 downstream of the trays 14 ensures that a single sensor 10 can detect movement/media type of sheets originating from different input trays when more than one input tray 14 is used.

Furthermore, it is not necessary that the sensor 10 have two light sensing elements 52, 54, nor is it necessary that the sensor 10 include the specific arrangement of the light emitting element 50 and light sensing elements 52, 54 as shown in FIGS. 1 and 2. All that is required is that the sensor 10 have a light emitting element, a light sensing element that can detect light deflected by the sheet, and a processor for determining when noise is received by the light sensing element.

As described above, the auto-compensator 32 or other driving mechanism is activated to cause the top sheet 40 in the input tray 14 to move through the media path 28. The sensor 10 may then be checked to determine if the sheet 40 is moving. If the sheet 40 is not moving, incrementally higher torque methods of engaging the sheet 40 may be attempted, as necessary. If it is determined that the sheet 40 is still not moving after the higher-torque methods have been engaged, the printer 12 alerts the user to a possible paper feed error. Thus, the processor 62 is preferably coupled to the tire 38 or other driving mechanism to cause the higher torque method of engagement to be activated if the processor determines that the sheet is not properly moving. The processor 62 is also coupled to various other controllable mechanisms in the printer 12, including the fixed sensor 42, feed roller 26, print head 20, etc.

Having described the invention in detail and by reference to the preferred environments thereof, it will be apparent that modification and variations thereof are possible without departing from the scope of the invention.

What is claimed is:

1. A sensor for detecting movement of a sheet of media comprising:
   a light-emitting element;
   a light-sensing element for detecting at least a portion of light emitted from said light emitting element and reflected by said sheet, said light sensing element providing an output;
   an auxiliary light sensing element for detecting at least a portion of light emitted from said light emitting element and diffused by said sheet; and a processor programmed to receive said output of said light sensing element and detect movement of said sheet based upon said output of said light sensing element and programmed to receive an output of said auxiliary light sensing element and determine a media type of said sheet based upon said output of said auxiliary light sensing element.

2. The sensor of claim 1 wherein said output of said light sensing element is noise when said sheet is moving.

3. The sensor of claim 1 wherein said sheet has non-uniform reflective properties such that the emitted light reflected by said sheet and said dynamic output of said light sensing element are non-uniform when said sheet is moving, and wherein when said processor receives said dynamic non-uniform output, said processor detects that said sheet is moving.

4. The sensor of claim 1 wherein at least one of said light sensing element or said light emitting element is displaced by movement of said sheet and said displacement causes said output of said light sensing element to be non-uniform, and wherein when said processor receives said non-uniform output, said processor detects that said sheet is moving.

5. The sensor of claim 1 wherein said light emitting element emits light that is directed towards said sheet.

6. The sensor of claim 1 wherein said light emitting element and said light sensing element are located on the same side of said sheet.

7. The sensor of claim 1 wherein said light emitting element emits light at a predetermined angle relative said sheet, and wherein said light sensing element detects light reflected from said sheet.

8. The sensor of claim 7 wherein said auxiliary light sensing element is located above the point on said sheet where light emitted from said light emitting element contacts said sheet.

9. A sensor for determining the media type of a sheet and detecting movement of the sheet comprising:
   a light emitting element;
   a light sensing element for detecting at least a portion of light emitted from said light emitting element and reflected by said sheet, said light sensing element providing an output; and
   a processor programmed to receive said output of said light sensing element and determine the media type of said sheet and detect movement of said sheet based upon said output.

10. The sensor of claim 9 wherein said processor detects movement of said sheet when said output is noise, and wherein processor determines the media type of said sheet based at least in part upon the amount of light received by said light sensing element.

11. A method for determining the media type of a sheet and detecting movement of the sheet comprising the steps of: providing a reflective optical sensor including a light emitting element, a light-sensing element which provides an output and an auxiliary light sensing element which provides an output;
    causing said light emitting element to emit light;
    causing said light sensing element to detect light emitted by said light emitting element and reflected by said sheet;
    causing said auxiliary light sensing element to detect light emitted by said light emitting element and diffused by said sheet
    determining a media type of said sheet based at least in part upon the amount of light received by said auxiliary light sensing element; and
    detecting whether said sheet is moving based at least in part upon said light received by said light sensing element.

12. A printer comprising:
    a print head for printing indicia on a sheet of media;
    a media path through which a sheet of media is moved for positioning said sheet to receive indicia thereon from said print head;
    a light-emitting element located adjacent said media path;
    a light-sensing element for detecting at least a portion of light emitted from said light emitting element and reflected by said sheet, said light sensing element providing an output;
    an auxiliary light sensing element for detecting at least a portion of light emitted from said light emitting element and diffused by said sheet, said auxiliary light sensing element providing an output; and
    a processor programmed to receive said output of said light sensing element and detect movement of said sheet based upon said output of said light sensing element and programmed to receive said output of said auxiliary light sensing element and determine a media type of said sheet.

13. The printer of claim 12 wherein said output of said light sensing element is noise when said sheet is moving.

14. The printer of claim 12 wherein said sheet has non-uniform reflective properties such that the emitted light reflected by said sheet and said dynamic output of said light sensing element are non-uniform when said sheet is moving, and wherein when said processor receives said dynamic non-uniform output, said processor detects that said sheet is moving.

15. The printer of claim 12 wherein at least one of said light sensing element or said light emitting element is displaced by movement of said sheet and said displacement causes said output of said light sensing element to be non-uniform, and wherein when said processor receives said non-uniform output, said processor detects that said sheet is moving.

16. The printer of claim 12 wherein said light emitting element emits light that is directed towards said sheet.

17. The printer of claim 12 wherein said light emitting element and said light sensing element are located on the same side of said sheet.

18. The printer of claim 12 wherein said light emitting element emits light at a predetermined angle relative said sheet, and wherein said light sensing element detects light reflected from said sheet.

19. The printer of claim 12 further comprising an input tray for storing sheets to be fed through said media path, and wherein said light emitting element and said light sensing element are part of a reflective optical sensor located adjacent said input tray to detect movement of a sheet at least partially located in said input tray.

20. The printer of claim 19 wherein said reflective optical sensor is maintained a fixed distance away from a top sheet in said input tray.

21. The printer of claim 19 further comprising a rotatable tire for engaging a top sheet in said input tray and moving said top sheet through said media path.

22. The printer of claim 21 wherein said reflective optical sensor and said tire are mounted onto a pivotal arm that is biased to engage said top sheet.

23. The printer of claim 21 wherein said processor is coupled to said tire to detect when said tire is being rotated.

24. The printer of claim 19 further comprising an arm located in said input tray and biased against a top sheet in said input tray, said arm including said light emitting element and said light sensing element.

25. The printer of claim 12 further comprising a driving mechanism for driving said sheet through said media path, said driving mechanism being coupled to said processor such that said processor can detect when said driving mechanism is activated.

26. The printer of claim 12 wherein said print head is mounted onto a carrier for reciprocal movement, and wherein said light sensing element and said light emitting element are mounted onto said carrier.

27. A method for feeding a sheet of media through a business machine comprising the steps of:
   providing a business machine having a media path, a driving mechanism for moving media through said media path, a light emitting element located adjacent said media path, a light sensing element, an auxiliary light sensing element and a processor connected to said light sensing element and said auxiliary light sensing element;
   causing said driving mechanism to engage a sheet of media to drive said sheet through said media path;
   causing said light emitting element to emit light that is reflected and diffused by said sheet such that said reflected light is at least partially sensed by said light sensing element and said diffused light is at least partially sensing by said auxiliary light sensing element;
   causing said light sensing element to provide, to said processor, an output indicative of light sensed by said light sensing element;
   causing said auxiliary light sensing element to provide, to said processor, an output indicative of the light sensed by said auxiliary light sensing element;
   causing said processor to determine whether said sheet is moving based upon said output of said light sensing element; and
   causing said processor to determine a media type of said sheet based upon said output of said auxiliary light sensing element.

28. The method of claim 27 wherein said driving mechanism is engaged at a low level of torque during said first causing step, and wherein if said processor determines that said sheet is not moving after a predetermined period of time, said driving mechanism is caused to engage said sheet at an increased level of torque to drive said sheet through said media path.

29. The method of claim 11 wherein said detecting step includes detecting, in real time, whether said sheet is moving.

30. The method of claim 11 wherein said detecting step includes detecting whether said sheet is moving based at least in part upon dynamic variations in the light reflected by said sheet and detected by said light sensing element.

31. The sensor of claim 1 wherein said processor is programmed to detect real time movement of said sheet.

32. The sensor of claim 1 wherein said processor is programmed to detect said movement of said sheet at least in part based upon dynamic variations in the light reflected by said sheet and detected by said light sensing element.

33. The printer of claim 12 wherein said processor is programmed to detect real time movement of said sheet.

34. The printer of claim 12 wherein said processor is programmed to detect said movement of said sheet at least in part based upon dynamic variations in the light reflected by said sheet and detected by said light sensing element.

35. A printer comprising:
   a print head for printing indicia on a sheet of media;
   a media path through which a sheet of media can be moved for positioning said sheet to receive indicia thereon as printed by said print head;
   a light-emitting element located adjacent said media path;
   a light-sensing element for detecting at least a portion of light emitted from said light emitting element and reflected by said sheet, said light sensing element providing an output;
   a processor programmed to receive said output of said light sensing element and detect movement of said sheet based upon said output; and
   an input tray for storing sheets to be fed through said media path, and wherein said light emitting element and said light sensing element are part of an optical sensor located adjacent said input tray to detect movement of a sheet located in said input tray.

36. The printer of claim 35 wherein said optical sensor includes an auxiliary light sensing element for detecting at least a portion of light emitted from said light emitting element and diffused by said sheet, and wherein said processor is programmed to receive an output of said auxiliary light sensing element and determine a media type of said sheet based upon said output.

\* \* \* \* \*